(12) United States Patent
Orsini

(10) Patent No.: US 12,216,626 B2
(45) Date of Patent: Feb. 4, 2025

(54) SECURE ZERO KNOWLEDGE DATA TRANSFORMATION AND VALIDATION

(71) Applicant: LO3 Energy Inc., San Francisco, CA (US)

(72) Inventor: Lawrence Orsini, San Francisco, CA (US)

(73) Assignee: LO3 Energy Inc., San Francisco, CA (US)

( * ) Notice: Subject to any disclaimer, the term of this patent is extended or adjusted under 35 U.S.C. 154(b) by 0 days.

(21) Appl. No.: 18/109,906

(22) Filed: Feb. 15, 2023

(65) Prior Publication Data
US 2024/0028570 A1   Jan. 25, 2024

Related U.S. Application Data

(63) Continuation of application No. 17/154,835, filed on Jan. 21, 2021, now abandoned.

(60) Provisional application No. 62/963,906, filed on Jan. 21, 2020.

(51) Int. Cl.
G06F 16/00    (2019.01)
G06F 16/215   (2019.01)
G06F 16/25    (2019.01)
G06F 40/00    (2020.01)
G06N 20/00    (2019.01)
H04L 9/32     (2006.01)

(52) U.S. Cl.
CPC .......... G06F 16/215 (2019.01); G06F 16/258 (2019.01); G06F 40/00 (2020.01); G06N 20/00 (2019.01); H04L 9/3247 (2013.01)

(58) Field of Classification Search
None
See application file for complete search history.

(56) References Cited

U.S. PATENT DOCUMENTS

| | | | |
|---|---|---|---|
| 11,182,691 B1 * | 11/2021 | Zhang | G06N 20/20 |
| 2001/0038347 A1 | 11/2001 | Avery et al. | |
| 2007/0271394 A1 * | 11/2007 | Pauly | H04L 67/565 |
| | | | 709/246 |
| 2018/0150528 A1 * | 5/2018 | Shah | G06F 16/254 |
| 2020/0371647 A1 | 11/2020 | Gerges et al. | |
| 2021/0224238 A1 | 7/2021 | Orsini | |
| 2021/0385251 A1 * | 12/2021 | Crabtree | G06F 16/951 |

* cited by examiner

Primary Examiner — Bai D Vu
(74) Attorney, Agent, or Firm — Fish & Richardson P.C.

(57) ABSTRACT

This specification allows for secure, original data to be attributed, transformed attestably and managed within a data center or distributed across a peer to peer network using zero knowledge proofs that allow the holder of transformed data to verify, with certainty, that their transformed data was derived from the attributed data source, without visibility into the contents of that source data.

17 Claims, 9 Drawing Sheets

SECURE ZERO KNOWLEDGE DATA TRANSFORMATION AND VALIDATION

CLAIM OF PRIORITY

This application is a continuation application of U.S. patent application Ser. No. 17/154,835, filed on Jan. 21, 2021, which claims priority under 35 USC § 119(e) to U.S. Patent Application Ser. No. 62/963,906, filed on Jan. 21, 2020, the entire contents of which are hereby incorporated by reference.

TECHNICAL FIELD

This disclosure relates to systems and methods for automated data processing.

BACKGROUND

Data security, data privacy, and the value of data is important. These aspects have led to advances in data encryption technology and integrated datacenter designs. Integrated datacenter designs can require every element of a data center's physical security to be implemented with other elements in mind to form an interlocking, layered network of security measures, each one enhancing the effectiveness of the others.

SUMMARY

This specification allows for secure, original data to be attributed, transformed attestably and managed within a data center or distributed across a peer to peer network using zero knowledge proofs that allow the holder of transformed data to verify, with reasonable certainty, that their transformed data was derived from the attributed data source, without visibility into the contents of that source data.

In particular, this specification describes semantics based architectures and methods for data normalization and transformation. These architectures and methods can be used in systems to cryptographically secure, normalize, transform, and validate cryptographically secured data used to communicate information between peering applications and business processes without exposing the underlying cryptographically secured data.

Data privacy relates to the topic of personally identifiable information (PII), or data that can relate or ascribe the identity of individuals. Personally identifiable information can be defined as any information about an individual maintained by an entity, including (1) any information that can be used to distinguish or trace an individual's identity, such as name, social security number, date and place of birth, mother's maiden name, or biometric records; and (2) any other information that is linked or linkable to an individual, such as medical, educational, financial, and employment information. PII is important and is subject to increasing levels of regulatory scrutiny. Maintaining strict control of access to PII is important.

A minimal amount of information can remain accessible, encrypted and stored in secure datacenters with layered security measures, surveillance, and/or multi factor authentication while limiting physical or network access to hardware used to create or store data. The barriers to data access under these conditions can create significant information asymmetry and the potential to create monopolies of knowledge, locked within data centers, which can stifle innovation and progress.

Using a peer-to-peer distributed file system which incorporates content-addressing allows secured content to be decoupled from its original server, such as a data center, and instead can be stored permanently and securely across the peered network. Peer to peer data storage allows data to be stored and served very close to data consumers, reducing cost and transmission latency while reducing the potential to create monopolies of knowledge.

The value of data to various parties can vary and change over time and in different contexts. Disclosing data to such parties can reverse information asymmetry and be quite valuable, although the costs of doing so can be unclear. If care is not taken to properly attribute, maintain security, and restrict access to data, the value of the data can be lost, and harm can be ascribed to the creators and owners of the data.

Creators of data on a data retailer's platform often have imperfect information about their data. For instance, this imperfect information can include: when their data is being collected, for what purposes, and at what consequence on a retailer of the data platform. In order to ascribe and secure value to the creator or owner of data, it is often imperative that the data itself is not revealed in the original format. Instead, the original data can be transformed to a format that is usable and salable to another party.

Data transformation refers to the process of converting data or information from a source format into the format of a new destination program or system. In practice, data transformation involves the use of a program that is able to read original data (e.g., in a source format) and determine a language/syntax/format into which the data must be transformed or translated (e.g., the format of a destination program). Transformation, or translation, enables the data to be usable by another program or system.

In one aspect, a computing device implemented method includes receiving data representing information stored at a node of a distributed network. The method also includes analyzing received data in a semantic manner to identify one or more data types reflected in received data, selecting one or more transforms based on the one or more data types of the received data and data types used by the one or more transforms, evaluating the received data using the one or more selected transforms to generate an evaluated result, and providing the evaluated result to the distributed network.

Implementations may include one or more of the following features. The method may include receiving a data transformation request comprising an address of the received data. The received data and the evaluated result may be cryptographically secured. The one or more selected transforms may be digitally signed and authenticated. Receiving the data may be based on whether the data has been previously validated. Evaluating the received data using the one or more selected transforms may include encoding an address of the received data into the evaluated result and/or encoding an address of the one or more selected transforms into the evaluated result. Selecting the one or more transforms may include comparing a signature representing a jurisdiction of a particular transform with a jurisdiction of the node, wherein selecting the one or more transforms may be further based on the comparison. Analyzing the received data in a semantic manner may include determining one or more sequences of data fields embedded in the received data using a machine learning system trained on historical data stored at the node.

In another aspect, a system includes a computing device that includes a memory configured to store instructions. The system also includes a processor to execute the instructions to perform operations that include receiving data representing information stored at a node of a distributed network. Operations also include analyzing received data in a semantic manner to identify one or more data types reflected in received data, selecting one or more transforms based on the one or more data types of the received data and data types used by the one or more transforms, evaluating the received data using the one or more selected transforms to generate an evaluated result, and providing the evaluated result to the distributed network.

Implementations may include one or more of the following features. The operations may include receiving a data transformation request comprising an address of the received data. The received data and the evaluated result may be cryptographically secured. The one or more selected transforms may be digitally signed and authenticated. Receiving the data may be based on whether the data has been previously validated. Evaluating the received data using the one or more selected transforms may include encoding an address of the received data into the evaluated result and/or encoding an address of the one or more selected transforms into the evaluated result. Selecting the one or more transforms may include comparing a signature representing a jurisdiction of a particular transform with a jurisdiction of the node, wherein selecting the one or more transforms may be further based on the comparison. Analyzing the received data in a semantic manner may include determining one or more sequences of data fields embedded in the received data using a machine learning system trained on historical data stored at the node.

In another aspect, one or more computer readable media storing instructions that are executable by a processing device, and upon such execution cause the processing device to perform operations that include receiving data representing information stored at a node of a distributed network. Operations also include analyzing received data in a semantic manner to identify one or more data types reflected in received data, selecting one or more transforms based on the one or more data types of the received data and data types used by the one or more transforms, evaluating the received data using the one or more selected transforms to generate an evaluated result, and providing the evaluated result to the distributed network.

Implementations may include one or more of the following features. The operations may include receiving a data transformation request comprising an address of the received data. The received data and the evaluated result may be cryptographically secured. The one or more selected transforms may be digitally signed and authenticated. Receiving the data may be based on whether the data has been previously validated. Evaluating the received data using the one or more selected transforms may include encoding an address of the received data into the evaluated result and/or encoding an address of the one or more selected transforms into the evaluated result. Selecting the one or more transforms may include comparing a signature representing a jurisdiction of a particular transform with a jurisdiction of the node, wherein selecting the one or more transforms may be further based on the comparison. Analyzing the received data in a semantic manner may include determining one or more sequences of data fields embedded in the received data using a machine learning system trained on historical data stored at the node.

In another aspect, a method for transforming data from one format to a second format includes receiving a data transformation request. The data transformation request includes an address that defines one or more input data sources and a process for evaluating the one or more input data sources. The method also includes evaluating, at a node of a distributed network, the one or more defined input data sources in accordance with the defined process to generate an evaluated result, and publishing the evaluated result to the distributed network.

Implementations may include one or more of the following features. The defined process for evaluating the one or more input data sources may include a transformation process. The transformation process may be digitally signed and authenticated. Evaluating the one or more defined input data sources may incorporate the address of the transformation process and/or the address of the one or more input data sources and/or data of the one or more input data sources into the evaluated result.

In another aspect, a method for verifying the accuracy of derived data includes sending a verification request, the verification request including (i) an address that defines one or more input data sources, (ii) a process for evaluating the one or more input data sources, and (iii) one or more challenges to be responded to by a first processing node of a distributed network. The method includes receiving responses to the one or more challenges. The method includes determining whether or not the received responses match the computations of a second processing node, wherein the responses are generated by: evaluating, at the first processing node of the distributed network, the one or more defined input data sources in accordance with the defined process to generate an evaluated result, and generating, at the first processing node, the responses to the one or more challenges based on the evaluated result.

Implementations may include one or more of the following features. The responses to the one or more challenges may not provide visibility into the one or more input data sources. The second processing node may be associated with a third party distinct from an owner of the one or more input data sources and a consumer of the evaluated result. The sent verification request may include a process for evaluating the one or more input data sources.

The technology described herein may have the following advantages. The technology described herein can allow for data to be securely managed within a data center and verifiably transformed without disclosing the contents of the data. Compared to a content-addressing scheme in which data is identified by a hash of its content, the "Contract Forest" addressing scheme described herein, identifies data by the sequence of parts (e.g. input data and data transformation functions) used to generate it. This enables new possibilities for rendering data. For example, the same data request can be serviced by multiple different nodes, each node having different access to inputs and different evaluation capabilities. The Contract Forest system also lends itself to various methods of verifying data transformations and enables many applications. For example, the owner of the data can license transformed data to other parties without revealing the original data, and can make the sale of the license without first transforming the data included in the transaction. In another example, a rulemaking entity such as a legislator can add their signature to a data transformation function and ensure that all data ingested by consumers within the rulemaker's jurisdiction include this transformation. In another example, a system can be implemented to only accept data that has been previously validated to meet certain constraints.

Throughout this specification, various parties may be involved in data ownership considerations. These parties can include: a creator, who is a producer or generator of data; a consumer, who uses data of other people; a prosumer, who uses their own created data; a decoder, who can unlock "locked" encoded information which makes them an owner of that information; a packager, who collects data for a particular use and adds value through formatting the information for a particular market or set of consumers; and a purchaser/licenser as owner, who buys or licenses creator's data creating a claim to ownership.

Using a peer-to-peer distributed file system which incorporates content-addressing allows secured or transformed content to be decoupled from its original server, such as a data center, and instead can be stored permanently and securely across the peered network. Peer to peer data storage allows data to be stored and served very close to data consumers, reducing cost and transmission latency.

The technology described herein can allow for data to be securely managed within a data center and verifiably transformed without disclosing the contents of the data. The Contract Forest system also lends itself to various methods of verifying data transformations and enables many applications. For example, the owner of the data can license transformed data to other parties without revealing the original data, and can make the sale of the license without first transforming the data included in the transaction.

A rulemaking entity such as a legislator can add their signature to a data transformation function and ensure that all data ingested by consumers within the rulemaker's jurisdiction include this transformation. A system can be implemented to only accept data that has been previously validated to meet certain constraints. For example, a system can be implemented to only accept data that has been previously analyzed and/or validated to meet certain constraints to minimize the work needed in the analysis of data sets.

One form of data evaluation may include natural language processing and machine learning and/or artificial intelligence to identify data sets and map them to the appropriate transformation. One form of the systems and methods described herein may use knowledge graphs to link structured and unstructured data, mapping business objects and concepts within various datasets together with their interrelations. The resulting, transformed data, may be considered a new data entity that contains none of the original data used in the original analysis and transformation and is not subject to data management requirements of the original datasets.

The data to be analyzed may be unstructured, semi-structured, or structured and may include common canonical to the structural and semantic metadata. This data may require analyses in preparation for transformation, these analyses may include but are not limited to, latent semantic analysis, probabilistic latent semantic analysis. The details of one or more embodiments of these systems and methods are set forth in the accompanying drawings and the description below. Other features, objects, and advantages of these systems and methods will be apparent from the description and drawings, and from the claims.

DESCRIPTION OF FIGURES

Like reference symbols in the various drawings indicate like elements.

DETAILED DESCRIPTION

Figure 1:
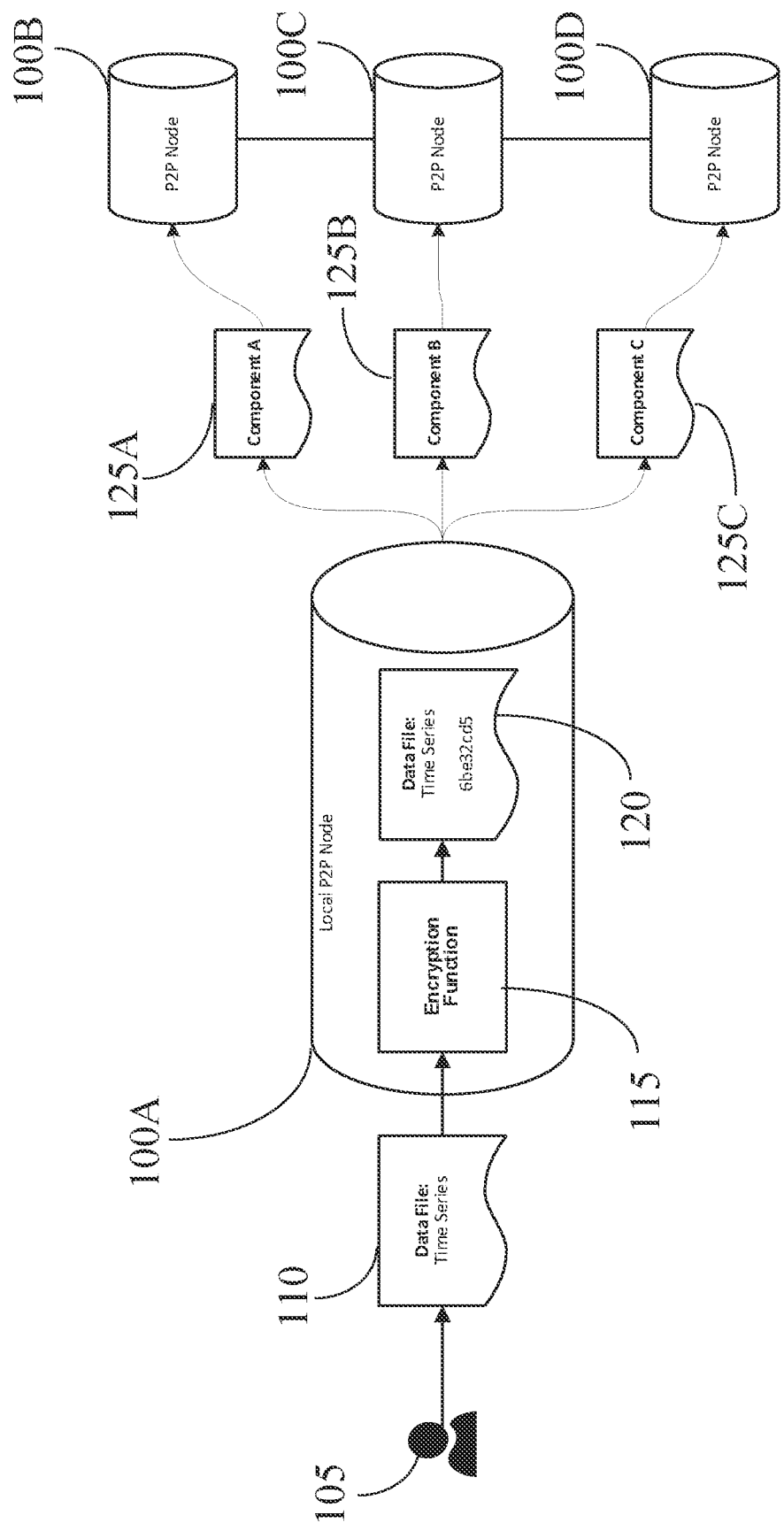
FIG. 1 is a schematic of adding data to a distributed network.

This specification describes systems and methods for transforming and validating data on a distributed network. FIG. 1 shows an example distributed network and how data can be added to the distributed network. The distributed network includes multiple nodes 100A-100D, which are able to communicate with one another over the network. In some implementations of the distributed network, each node may be a peer to peer (P2P) node. A user 105 may have access to a local P2P node 100A and may wish to add a data file (e.g., time series data) 110 to the distributed network. In some cases, the local P2P node is able to encrypt the data file 110 using encryption function 115, thereby generating encrypted data file 120. The local P2P node then breaks apart the encrypted data file 120 into various components (125A-125C), with the components being circulated among the network's nodes. For example, Component A (125A) can be sent to P2P node 100B for storage; Component B (125B) can be stored on P2P node 100C; and Component C (125C) can be stored on P2P node 100D. While the local P2P node 100A is shown to be capable of performing encryption, encryption of data file 110 is not required, and in some cases, the original data file 110 can be broken into various components and circulated among the nodes of the distributed network.

Once data has been added to a distributed network, one system for transforming and validating the data is referred to as a Contract Forest. A Contract Forest functions by creating outputs based on executable content identifiers (XCIDs) referred to as "Contract Forest Addresses" or "Contracts".

A contract identifies many components including an evaluator, input data, output format and version identifiers. In practice, a contract can be any type of data file. It can be a set of key-value pairs, a definition of data constraints, a set of operations on a data schema, or any other collection of bytes. In addition to this data, each contract contains a list of zero or more references to related contracts. Contracts with zero references are newly written documents, while contracts with one or many references are created as a result of some processing on the network. The references between contracts form a directed acyclic graph (DAG).

Contracts can be conceptualized in two forms: expressed and evaluated. Expressed contracts define a set of behaviors to be executed in the context of a given "Evaluator". Evaluated contracts are the results of an expressed contract after they have been rendered by the evaluator. For the purposes of this application, an evaluator is defined as a set of programmable behaviors that interprets expressions (inputs) and creates results (outputs). A Contract Forest can support a variety of Evaluators. Evaluated outputs are created as new files, which can be described by their Contract Forest address, a content-address or any other address (i.e.

a local Unix filesystem). Both expressed contracts and evaluated contracts are treated equally in terms of the Contract Forest structure.

Although the contract forest will contain many types of data (including source data, data formats, transformation logic, evaluated transformations, etc.), every file is treated equally as a node in the DAG. Combined with the references in each contract, this enables a user to "walk the tree" of references and request confirmation of these references from trusted nodes. This enables the holder of a data file to verify that their data was derived from a specified source, without visibility into the contents of that source.

For clarity, an example contract forest address may be: "input addr: /ipcf/cue/expand/QmY/ipcf/cue/ipfs/QmA/ipfs/QmB/ipfs/QmD/expand/QmX". Within this address, "ipcf", "cue", "expand", and "ipfs" can correspond to functions or commands that perform operations on input data, while "QmY", "QmA", "QmB", "QmD", and "QmX" can correspond to nodes within the DAG which identify data to be loaded and/or receive one or more operations.

As demonstrated in this example, each contract created as a result of one or more input contracts passed to an evaluator contains references to its relevant sources in its address. The Contract Forest addressing mechanism is a tree of components which define the input data, a method for loading and evaluating inputs, and how the output should be generated. Input data can be identified and loaded in many ways (e.g. local filesystem, content-addressed data network, relational database query, semantic matter, etc.). The Contract Forest addressing mechanism can thus serve as a means of requesting a desired result. While content-addressed data is identified by a hash of its content, a Contract Forest address is identified by the sequence of parts used to create the result.

The Contract Forest addressing mechanism enables new possibilities for rendering data. For example, a request issued for the evaluated results of a Contract Forest address could be serviced by any of (A) a node possessing the exact result, (B) a node possessing required direct inputs and capable of executing the evaluation or (C) a node possessing the right combination of inputs to the direct inputs and evaluation logic. Regardless of the approach, the recipient of data is able to receive the correct result.

When a user wishes to verify the authenticity of the references included in a Contract Forest address, the contract can be reevaluated. The output of the evaluation provides a content address which can be compared against the reference example. Note that this does not require visibility into the underlying data the hash represents. Any change in the underlying data will result in a change to the address, which will signify a faulty reference. This verification process is feasible at any point along the DAG. Users can follow the list of references and request verification at any point of the tree. Moreover, to verify the results of any particular data transformation, various verification processes can be implemented such as those describe herein.

In general, a Contract Forest does not prescribe the specifics of the addressing scheme. Address interpretation specifics could differ based on syntax, source file systems or other features. The Contract Forest addressing mechanism simply describes the process of using an address to identify a result all the way to its root, which functions by computing from the root outward toward the end result. To do this, the Contract Forest can leverage DAGs, hash addressable data, idempotent contracts, distributed hash tables, and other components found in many distributed systems, which are well known in the art.

Figure 2:
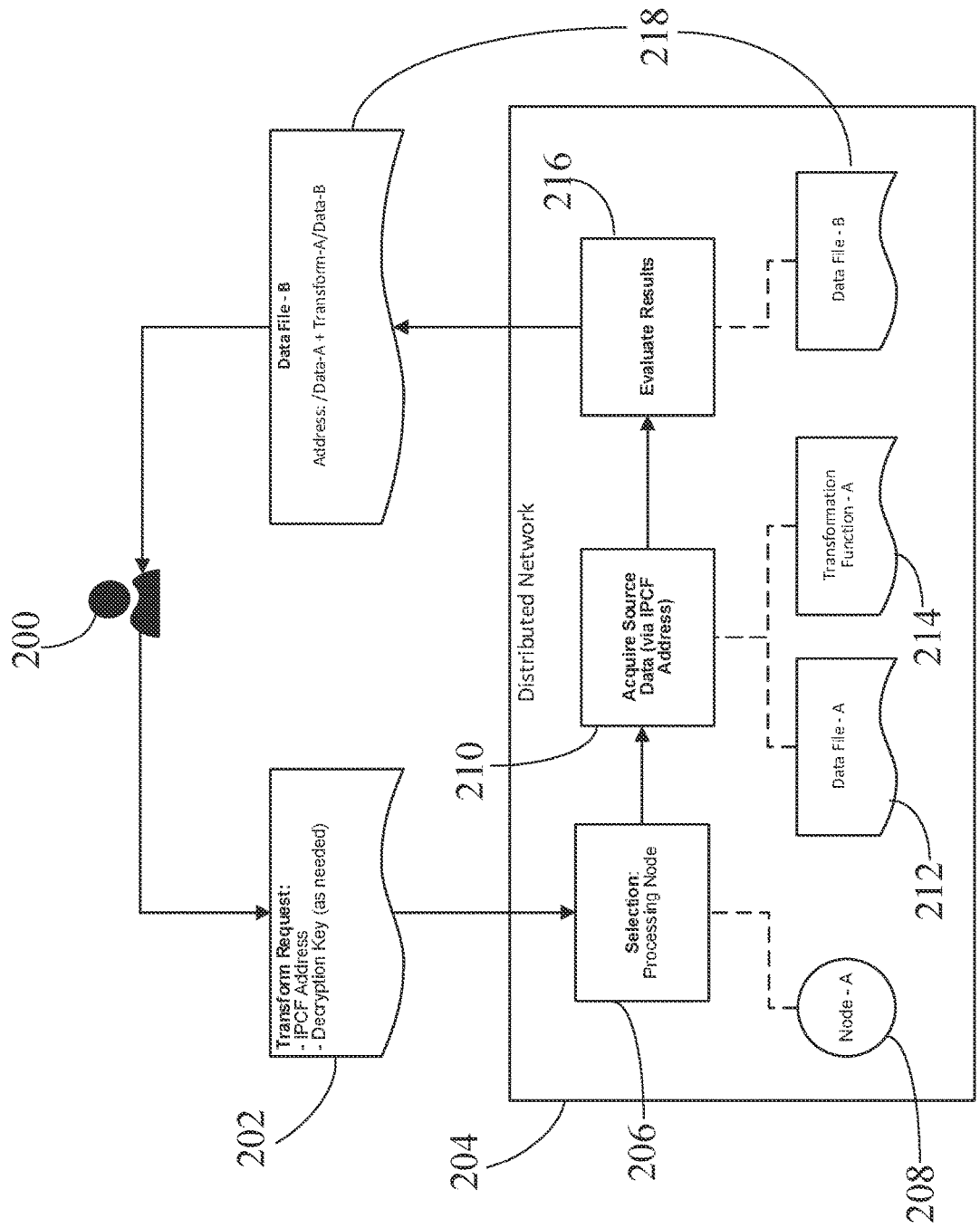
FIG. 2 is a schematic of data transformation using a Contract Forest address on a distributed network.

FIG. 2 shows an example of how a Contract Forest system can be used to implement data transformation on a distributed network. First, an initiator 200 submits a data transformation request 202 to be serviced by a distributed network 204. The data transformation request 202 can include a Contract Forest address (IPCF address) and, if needed, a decryption key. For example, a decryption key may be necessary to decrypt encrypted data stored on the distributed network 204. In this case, the Contract Forest address is an expressed contract because it defines a set of behaviors to be executed in the context of a given evaluator. As described above, the Contact Forest address defines the set of inputs that can be used to arrive at a valid result to service the initiator's transform request 202.

The distributed network 204 receives the transform request 202 and selects a processing node (206) to process the request. For example, the distributed network may select Node-A 208. In some cases, nodes can be selected based on a set of qualification criteria associated with the transform request 202. For example, a node can be selected based on its ability to access the input data specified in the Contract Forest address and execute the evaluator logic needed to create the transformed data output. A node can further be selected based on any number of characteristics including its current availability, processing power, memory specifications, etc. In some cases, a node may be selected based on a preference indicated in the transform request 202.

Once selected, the processing node, (e.g., Node-A 208), then acquires source data via the IPCF address (210). For example, Node-A 208 can evaluate the Contract Forest address included in transform request 202 and identify the requisite inputs (e.g., Data File-A 212; Transformation Function-A 214) from the distributed network 204.

In some implementations, the source data (e.g., File-A 212) is analyzed in a semantic manner to identify one or more data types of the source data. In some examples, this is implemented by block 210 shown in FIG. 2. For example, a semantic search can determine how often a particular word appears in the source data (e.g., as a word graph) and uses the words that appear most often to determine the data type of the source data. For example, if the semantic search determines that "kW" appears in the source data at least once, the semantic search may determine that the source data is related to energy data. If "kW" appears in the source data more than once, this result increases a certainty that the source data is related to energy data. In this way, the semantic search determines one or more sequences of data fields (e.g., "kW", "kWh," etc.) embedded in the source data. In some examples, the semantic search is performed by a machine learning system or artificial intelligence system trained on historical data to identify the source data.

In some cases, the inputs used by Node-A 208 may not be the direct ancestors (e.g., parents) of the desired output specified in the Contract Forest address. For example, rather than retrieving the direct ancestor inputs specified in the Contract Forest address from the distributed network 204, Node-A 208 may alternatively compute the direct ancestor inputs by evaluating a second set of inputs (e.g., grandparents) used to generate the direct ancestor inputs. This may be preferable, for example, if processing Node-A 208 already holds the second set of inputs (e.g., the grandparents of the desired output) in local storage.

In some implementations, the Transformation Function-A 214 (or generally "transforms") is selected based on the data types of the source data and data types used by the transforms. In some examples, this is implemented by block 206 shown in FIG. 2. For example, if the source data is identified to be related to energy, then the Node-A 208 selects transformation functions that are related to energy. In some examples, more than one transformation function is used in succession on the source data, and all of the transformation functions can be selected based on the identified data types of the source data. This selection process reduces the change of evaluation source data with incorrect or otherwise incompatible transformation functions.

In some implementations, Node-A 208 compares a signature representing a jurisdiction of a particular transform with a jurisdiction of the Node-A 208 and/or the initiator 200 of the data request. In some examples, this is implemented by block 206 shown in FIG. 2. In this example, the Node-A 208 can select the transforms based on whether the jurisdiction of the Node-A 208 and/or the initiator 200 matches the jurisdiction represented by the signature of the particular transforms. This allows an additional layer of protection of the underlying source data by preventing access to initiators 200 without proper authentication.

After acquiring source data (210) (the source data (210) includes the Data File-A (212) and the Transformation Function-A (214)), Node-A 208 evaluates the results (216) by running the identified inputs through an evaluator to generate an output (e.g., Data File-B 218). In this way, Node-A 208 transforms the Data File-A (212) using the Transformation Function to generate data that is accessible by the initiator 200 and/or anyone who has access to the distributed network 204 and also has proper authentication credentials. For example, the original data (e.g., Data File-A 212) can be encrypted (e.g., cryptographically secured, digitally signed, and/or authenticated), and the evaluator can use the decryption key provided by transform request 202 to decode the encrypted data. The evaluator can also optionally use a public key of the initiator 200 to encrypt the data of the generated output. In this way, both the original data and the generated output data can be cryptographically secured, digitally signed, and/or authenticated. In some examples, the transform is also cryptographically secured, digitally signed, and/or authenticated.

In some implementations, Node-A 208 part of the evaluation process (216) includes encoding an address of Data File-A (212) into the generated result 218. For example, the address can be decoded from the generated result 218 (e.g., by the initiator 200) to verify the source and/or validity of the data file. In some cases, an address of the selected transforms (214) is also encoded into the generated result. Similarly, the transform address can be decoded from the generated result 218 (e.g., by the initiator 200) to verify the transformation function (214) and/or validity of the transformation function (214). The output (e.g., Data File-B 218) is stored on the distributed network 204. In some implementations, Data File-B 218 can be stored on the distributed network 204 as an evaluated contract with a unique Contract Forest address. Data File-B 218 can be sent to the initiator 200, thereby fulfilling the transform request 202. In some cases, the initiator 200 can download Data File-B 218 from the distributed network 204.

In this way, both Data-File-A and Data-File B can reside on the distributed network 204. Data-File-A contains sensitive information and, in some cases, the entire data file is not accessible users. Data-File-B is a version of Data-File-A that has been transformed to remove at least some sensitive data without modifying the original source data of Data-File-A. As noted in the examples below, preferably the transformation removes all sensitive data without modifying the original source data of Data-File-A.

Implementations of data transformation on a distributed network using a Contract Forest system can enable various applications. In one application, the owner of data can sell licenses to transformed versions of the data which do not yet exist on a distributed network. For example, an owner may own a data file that, in its original format, contains personally identifiable information (PII). This format has a supported transformation to remove all PII. After reaching a license agreement with another party (e.g., a licensee), the owner can create a Contract Forest address (e.g., an expressed contract) specifying the result of the data file and the transformation function. The owner can then whitelist the licensee (e.g., by whitelisting a peerId associated with the licensee in the processing node) for the Contract Forest address. When the licensee requests the Contract Forest address (e.g., via a transform request 202), the processing node (e.g., Node-A 208) can recognize the licensee's peerId and proceed to evaluate the address, generating the transformed data output (e.g., an evaluated contract). In this example, the licensee never receives the underlying data in its original format, so the PII is protected. Furthermore, the sale of the license was able to occur without first transforming the data included in the transaction.

In one application, an initiator 200 may have direct access and visibility of both underlying data in its original format and the transformation function. This visibility is conferred to the processing node (e.g., Node-A 208), which transforms the data, and the initiator 200 receives the transformed output (e.g., Data File-B 218).

In one application, an initiator 200 may use the transformed data received from the distributed network 204 to verify the authenticity of data already in custody. For example, verification can be performed by checking the work of a first processing node (e.g., Node-A 208) against the work of a peer node. Systems and methods for verification of data within the Contract Forest framework are further described herein.

Figure 3:
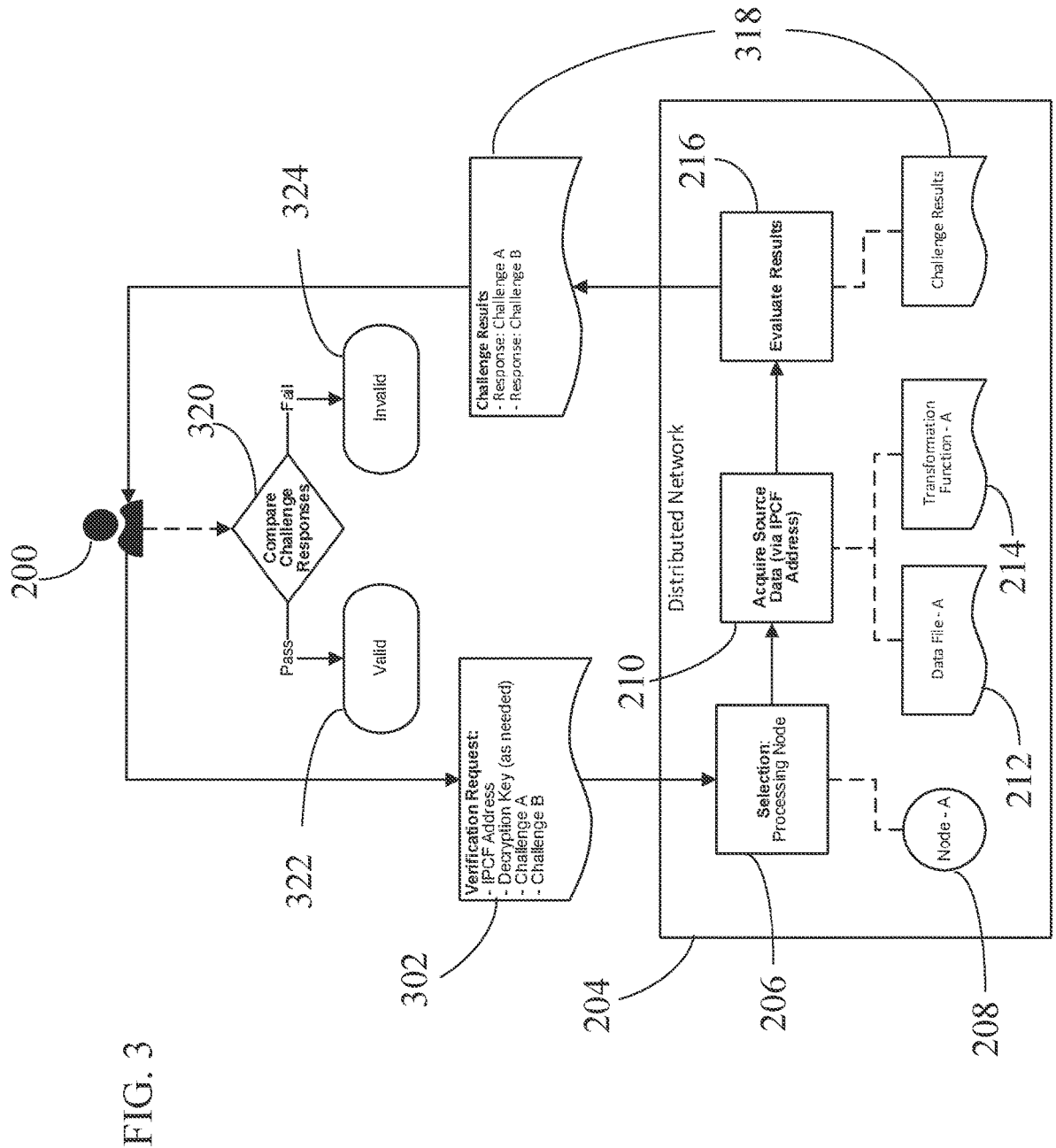
FIG. 3 is a schematic of the verification of data via challenge requests.

FIG. 3 shows verification of data through the use of challenge requests. The process for verification follows a similar flow to data transformation as described in FIG. 2, with like reference symbols in the figures indicating like elements. However, rather than submitting a transform request 202, in the setting of verification, the initiator 200 can submit a verification request 302. The verification request includes a Contract Forest address (IPCF address), a decryption key (as needed), and one or more challenges (e.g., Challenge A, Challenge B) which are to be computed by the selected processing node (e.g., Node-A 208). Examples of challenges include identifying the value of a particular data field, computing the sum of particular data fields, generating the hash of contents of each object within the evaluated result, etc. In general, a challenge may be any request to a processing node (e.g., Node-A 208) that provides evidence that the processing node has access to valid input data and is properly transforming the input data in accordance with an initiator's request. In some cases, challenges may be designed to not require the processing node to disclose information about the underlying data to the initiator 200, for example, via the implementation of zero-knowledge proofs. In order to select a processing node (206) in this verification setting, the distributed network 204 can further account for each node's capability of computing the challenges requested in the verification request 302.

Upon acquiring the source data (210), the processing node (e.g., Node-A 208) evaluates the results (216) of the verification request 302, and outputs the generated challenge results 318. In contrast to the data transformation setting described in relation to FIG. 2, the verification setting does not return the entire transformed data file 218 to the initiator 200. Only the challenge results 318 are returned to the initiator 200. This can protect the value of the underlying data. The challenge results includes responses to the challenges included in the verification request 302. Upon receiving the challenge results 318, the initiator 200 is able compare the challenge responses (320) to the initiator's own computations and/or the computation of other processing nodes (e.g., a trusted third party node). Matching results may cause the initiator 200 to conclude that the underlying data is valid (322) and is being processed in a consistent and valid manner. However, mismatched results can indicate invalid (324) underlying data and/or improper behavior by one or more processing nodes.

The verification of data via challenge request described in relation to FIG. 3 can be implemented such that verification is provided by a third party trusted node. For example, an owner of data may provide full or partial access to specific components of the data sets to trusted third party actors. Licensees can then request verification according to specific challenges supported by the trusted party. In some cases, the owner of the data may interact with multiple third party actors. For example, one third party actor, referred to as a "processor", can perform data transformations on behalf of the owner for many licensees. The owner could also employ a second third party actor, referred to as a "verification agent", to provide answers to one or more challenges submitted by the licensees via verification requests. Licensees can then compare the answers from the verification agent to the data received from the processor. In some cases, discrepancies can be reported to the owner and/or tested to determine which actor is at fault. In one example, within the finance sector, the owners and licensees may correspond to actors such as Bank of America, SoFi, and Lending Club; the processors may correspond to actors such as Experian, Equifax, and TransUnion; and the verification agent may correspond to the Consumer Financial Protection Bureau. In another example, within the energy industry, the owners and licensees may correspond to actors such as Sunrun, ConEd, and SolarEdge; the processors may correspond to actors such as Schneider Electric, UtilityAPI, and Urjanet; and the verification agents may correspond to regulators such as Hawaii PUC or grid operators such as PJM.

Figure 4:
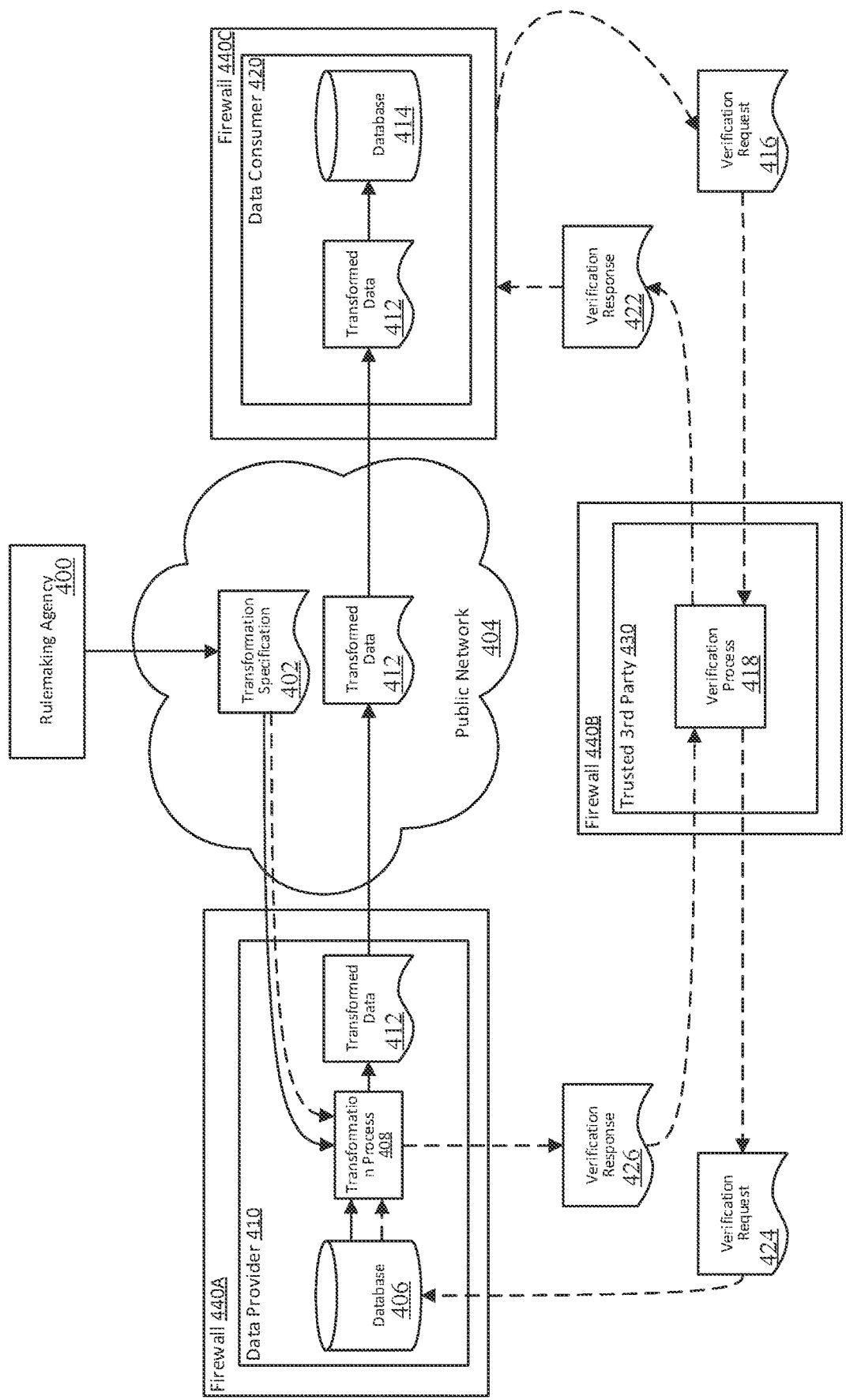
FIG. 4 is a schematic of the verification of data via approved transformation contracts.

In some cases, certain transformation functions may be approved (e.g., by a rulemaking entity or regulator) and required to be performed on certain data ingested by consumers. In such cases, it can be important to (i) ensure that the approved transformations are performed on the data ingested by consumers and (ii) verify that the approved transformations are performed in a consistent and valid manner. For example, a regulator may require that all health-related data be transformed to remove all PII before being ingested by consumers. It can be important to be able to check that (i) an approved PII-removing transformation has been applied, and that (ii) the approved transformation has been performed correctly. FIG. 4 shows an example of how to implement verification of data via approved transformation contracts. In this implementation, the relevant parties include a rulemaking agency 400, a data provider 410, a data consumer 420, and a trusted third party 430. The data provider 410, the data consumer 420, and the trusted third party 430 are all protected by distinct firewalls 440A-C. The solid line arrows correspond to implementation of the approved transformation process while the dashed line arrows correspond to verification of the approved transformation. For clarity, the implementation shown in FIG. 4 is described in three steps corresponding to FIGS. 5-7 respectively with like reference symbols in the drawings indicating like elements.

Figure 5:
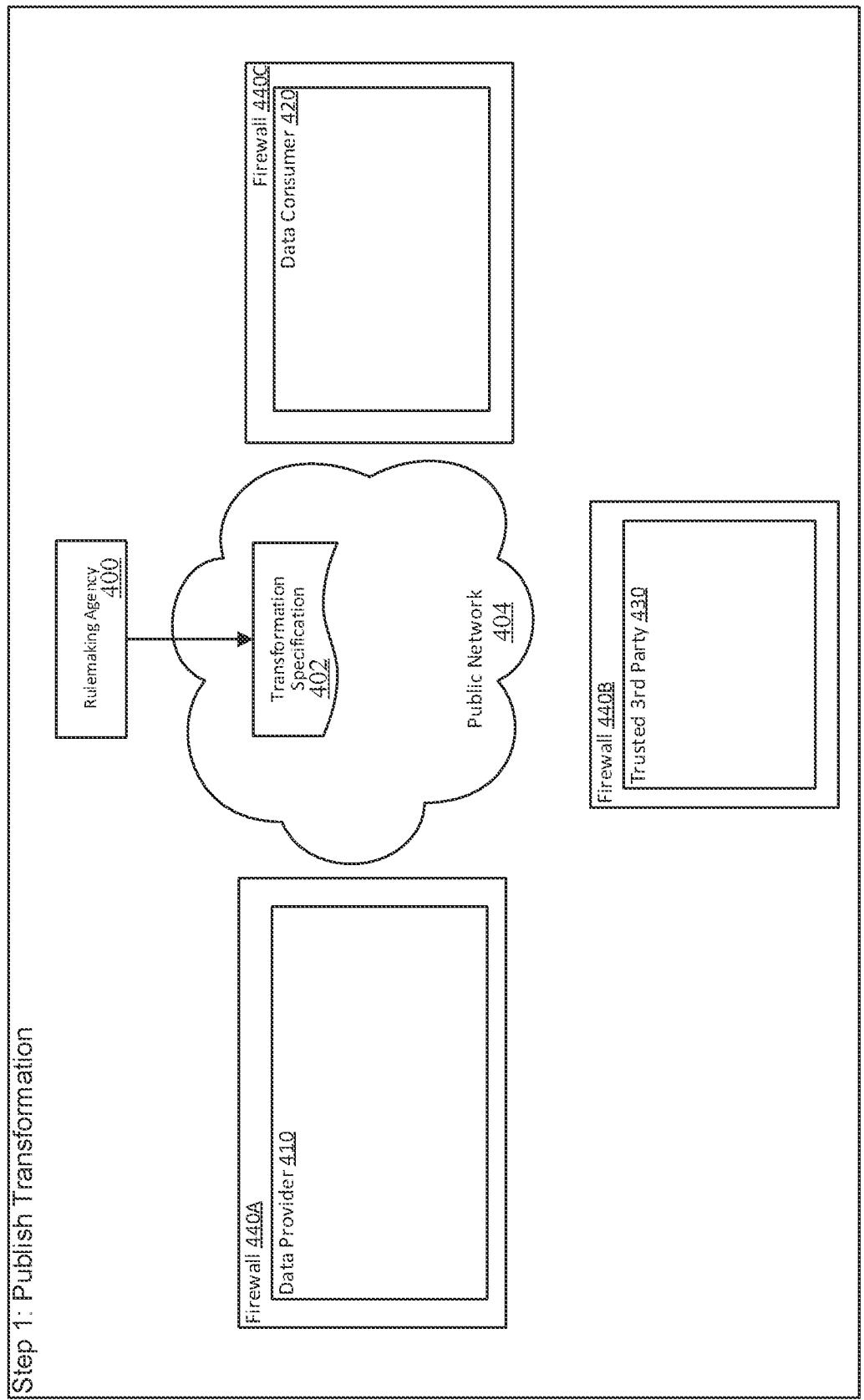
FIG. 5 is a schematic of publishing a signed transformation function.

FIG. 5 shows a step for publishing an approved transformation function. In this step, a rulemaking agency 400 (e.g., a regulator) adds their signature to a transformation function, sometimes referred to as a transformation specification 402, on the public network 404. The signature of the rulemaking agency 400 can signify that the signed transformation specification 402 has been approved by the rulemaking agency 400. In some cases, the transformation specification 402 can be created by the rulemaking agency 400 themselves. In other cases, the transformation specification 402 can be created by another party, but may be signed by the rulemaking agency 400. In either case, the signed transformation specification 402 is published with a corresponding Contract Forest address on the public network 404.

Figure 6:
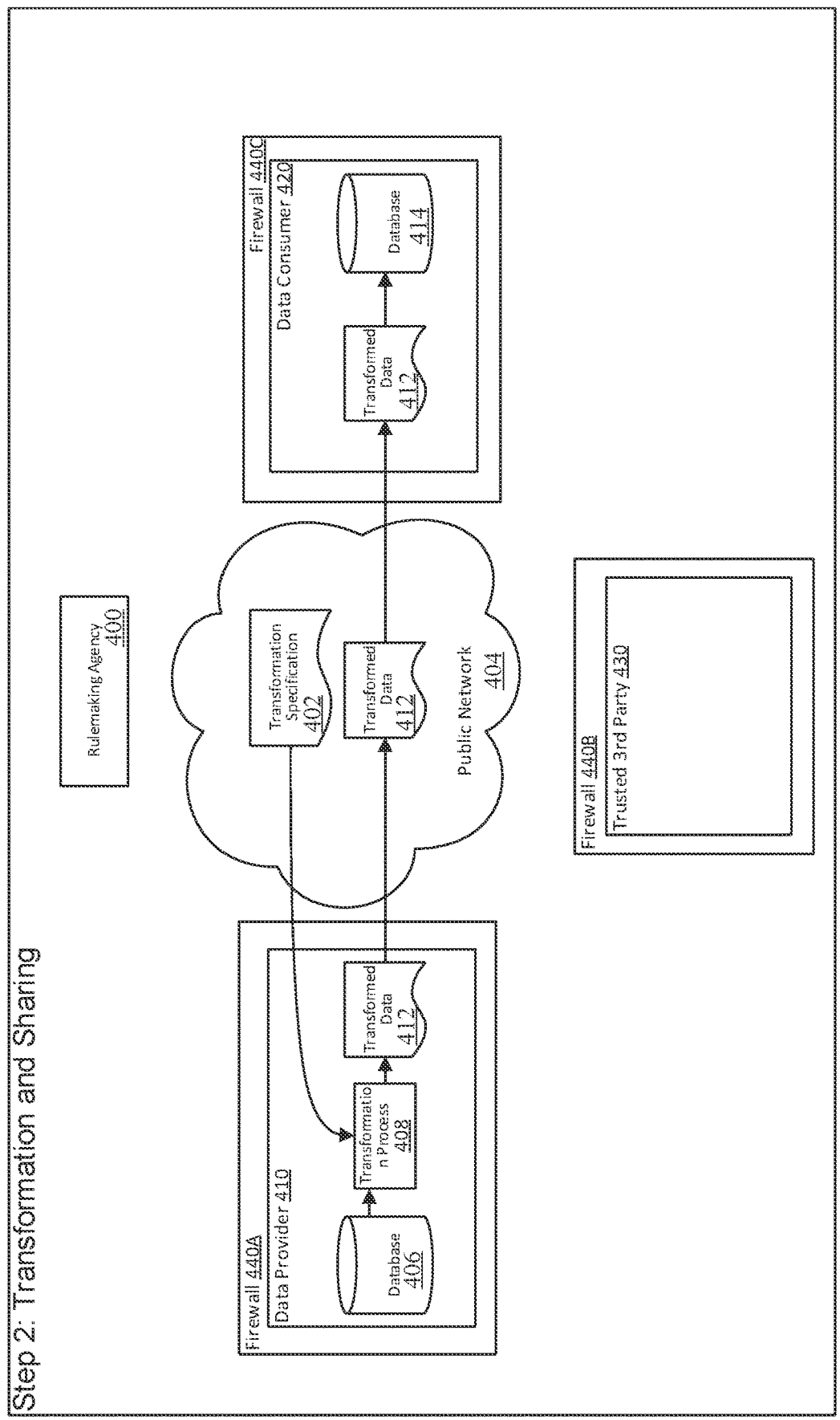
FIG. 6 is a schematic of performing an approved transformation and sharing the output with a data consumer.

FIG. 6 shows a step for performing a data transformation using the approved (e.g., signed) transformation specification 402, and sharing the output with the data consumer 420. The data provider 410, having access to local database 406, uses the approved transformation specification 402 to perform a transformation process 408 that generates transformed data 412. In some cases, the transformation process 408 can include one or more transformations in addition to the approved transformation specification 402. In some cases, the data transformation can be performed in response to submission of a transform request by the data consumer 420 as described in relation to FIG. 2. The transformed data 412 is published to the public network 404 with its own Contract Forest address and is shared with the data consumer 420. For example, the transformed data 412 can be sent directly to the data consumer 420 or can be downloaded by the data consumer 420 from the public network 404. In some cases, the transformed data 412 can be stored by the data consumer 420 on a local database 414 accessible to the data consumer 420. While FIG. 6 shows the transformation process 408 being performed by the data provider 410, in some implementations, the transformation process can be performed by a third party "processor" or any other node within the distributed network.

In some cases, all data ingested by data consumers within the jurisdiction of rulemaking agency 400 must include the approved transformation specification 402. Within the context of the Contract Forest, the data consumer 420 can easily ensure that this requirement has been met by checking if the Contract Forest address of the received transformed data 412 includes the address of the approved transformation specification 402.

Similarly, in some cases, a system may create a rule for itself to only accept data previously validated to meet the constraints (e.g., no change in the output data structure) of a specific data format. This can easily be implemented by checking the Contract Forest Address of the data to ensure that it has been previously validated.

Figure 7:
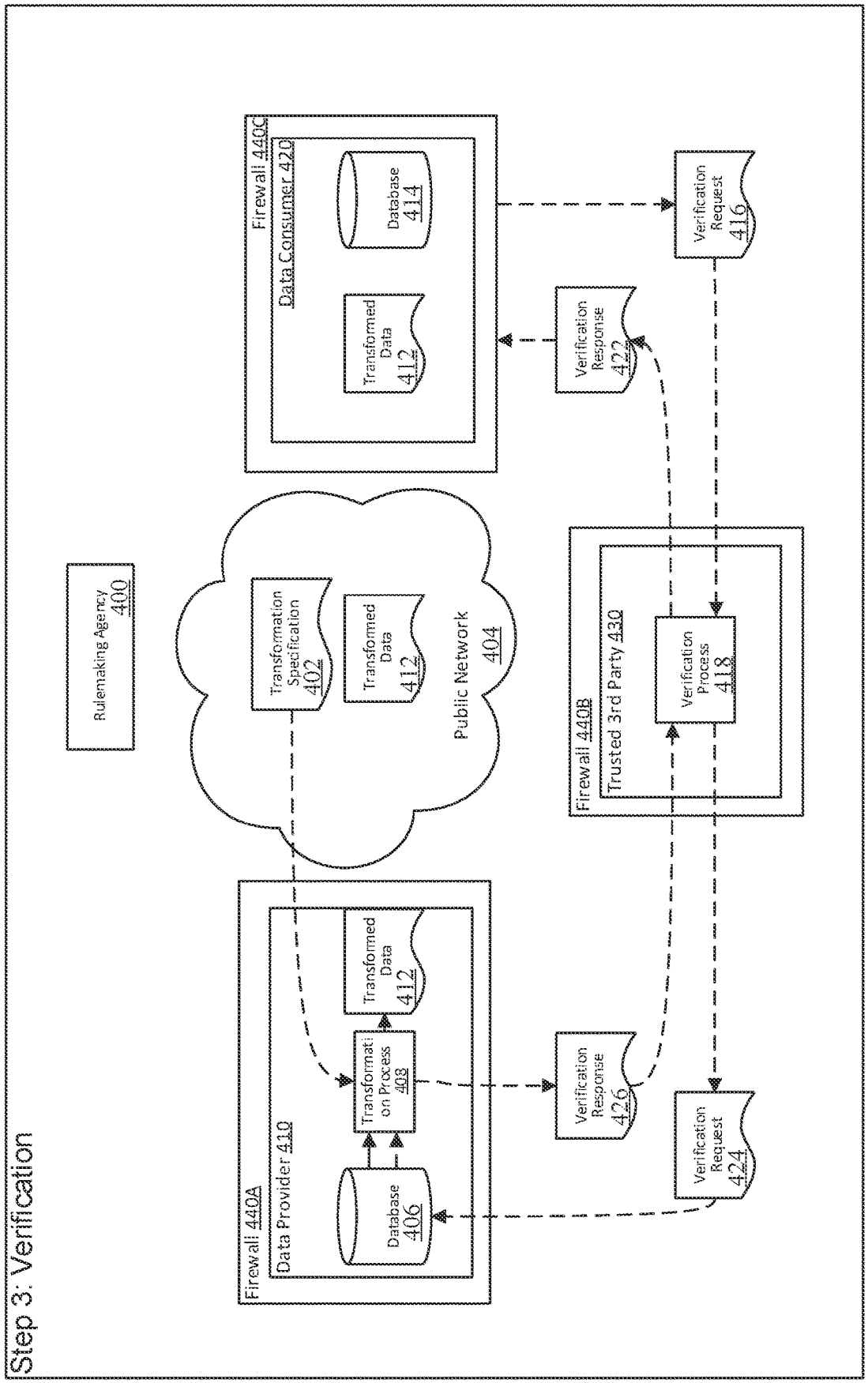
FIG. 7 is a schematic of performing verification through a trusted third party.

As described previously, in addition to checking that the approved transformation specification 402 had been applied to generate the transformed data 412, the data consumer 420 may also wish to verify that the transformation specification 402 was implemented properly by the data provider 410. FIG. 7 is a schematic of performing such verification through a trusted third party 430. Verification can be performed using the challenge request process described above in relation to FIG. 3. That is, the data consumer 420 can submit a verification request 416 to the trusted third party 430 requesting the third party 430 to perform a verification process 418 (e.g., one or more challenges) and return the verification response 422 to the consumer 420. In some implementations, the data consumer 420 can submit the verification request directly to the trusted third party 430, while in other implementations, the trusted third party 430 is selected by the distributed network from among multiple processing nodes. The verification process 418 can be performed on a sampling basis, or for every file received by the data consumer 420.

In some implementations, the trusted third party 430 can act as an intermediary between the data consumer 420 and the data provider 410. For example, in order to provide the verification response 422 to the data consumer 420, the verification process 418 may entail that the trusted third party 430 send a verification request 424 to the data provider 410 and analyze the corresponding verification response 426. For example, the verification request 416 sent from the data consumer 420 to the trusted third party 430 can be a prompt that causes the trusted third party 430 to initiate the verification process 418 and send the verification request 424 to the data provider 410. The trusted third party 430 then compares the verification response 426 to its own computations or the computations of another node and reports the results back to the data consumer 420 (e.g., in verification response 422). Through this process, the data consumer 420 can be confident that the data transformation has been performed by the data provider 410 in a consistent and valid manner.

In some implementations, the trusted third party 430 can perform verification processes on its own accord (e.g., without first receiving a verification request 416 or other prompt from the data consumer 420). For example, the trusted third party can, of its own accord, send verification request 424 to the data provider 410 and check that corresponding verification response 426 aligns with its own computations. This can be done periodically, on a predetermined schedule, or in response to an indication of improper behavior by one or more nodes of the distributed network. The results of the verification process 418 can then be sent to the data consumer 420 (e.g., immediately upon completion, on a predetermined schedule, only when improper behavior is detected, only when requested by the data consumer 420, etc.).

In some implementations, verification can be performed within a data transformation process such that the transformed data output is not shared with the data consumer until the transformation has been verified. In such implementations, data transformation largely follows the process described in relation to FIG. 2. However, after the processing node evaluates the results (216) to generate transformed Data File-B 218, verification is performed on the distributed network 204. The evaluated results (e.g., Data File-B 218) are sent to a verification agent (e.g., a trusted third party), which performs one or more tests (e.g., challenge requests as described in relation to FIG. 3) or compares the content address of the evaluated results to its own computations. Upon verifying the transformation, the verification agent can add its signature to the accepted results, and the verified transformed data can be shared with the initiator 200 of the data transform request.

As described previously, the systems and methods described herein for transforming and validating data on a distributed network may or may not employ encryption of the data. Encryption is not explicitly required for data on the Contract Forest. Data can be written unencrypted and still be eligible for each of the transformation and verification services described herein. However, data can be encrypted using one or more techniques employable by the user. In most cases, processing nodes using encrypted data for transformation or verification will need to be able to decrypt data. Processing nodes can receive decryption keys from the transformation or verification request, or they can maintain the decryption keys internally. In some cases, data operations can occur while encrypted. The approach used to operate on data is at the discretion of the user. In some cases, the Contract Forest can treat encryption as another transformation. For example, if desired, transition of data from an unencrypted state to an encrypted state can simply be described as another data transformation specified in the Contract Forest address.

Figure 8:
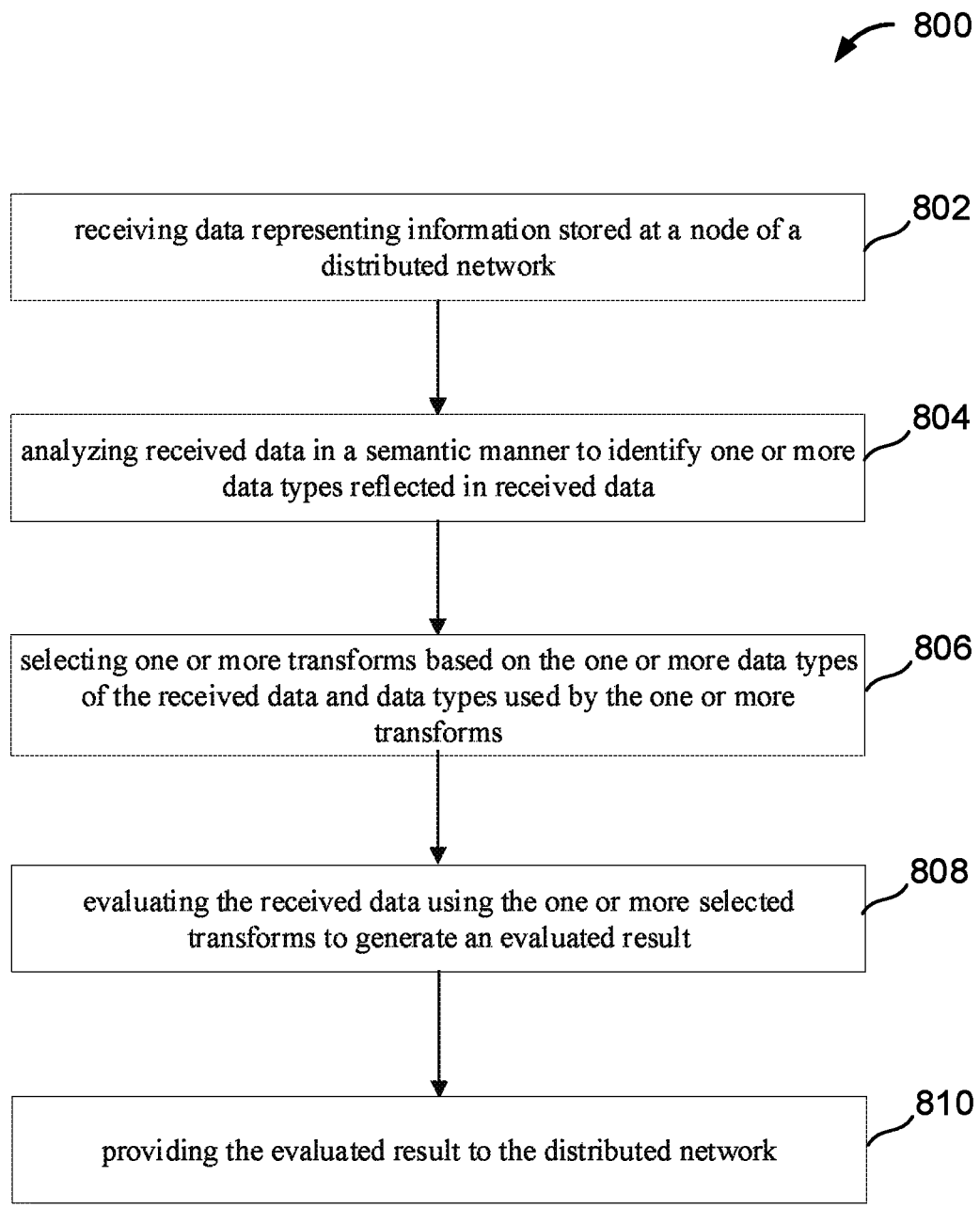
FIG. 8 is a flowchart representing operations of data transformation using a Contract Forest on a distributed network.

Referring to FIG. 8, a flowchart 800 represents operations of data transformation using a Contract Forest on a distributed network (e.g., the Contract Forest system shown in FIG. 2). Operations of the Contract Forest system are typically executed by a single computing device (e.g., the node A 208); however, operations of the font service manager may be executed by multiple computing devices (e.g., any or all of the P2P nodes 100 shown in FIG. 1).

Operations of the Contract Forest system may include 802 receiving data representing information stored at a node of a distributed network. For example, the data received can be the source data that is located via the IPCF address (210) shown in FIG. 2. In this example, the received data is the Data File-A 212. In some examples, the information is PII information and/or is cryptographically secured, digitally signed, and/or authenticated. Operations of the Contract Forest system may include 804 analyzing received data in a semantic manner to identify one or more data types reflected in received data. For example, as explained above, the semantic manner can identify the received data by determining a word graph of one or more sequences of data fields embedded in the received data. In the example above, the semantic manner identifies the received data type to represent energy data because of the occurrence of data fields (e.g., "kW", "kWh") in the received data.

Operations of the Contract Forest system may include 806 selecting one or more transforms based on the one or more data types of the received data and data types used by the one or more transforms. For example, as explained above with reference to block 206 of FIG. 2, the Node-A 208 can select the transforms that are related to the one or more data types of the received data. For example, transforms related to energy data are selected when the received data is identified as energy data, transforms related to financial data are selected when the received data is identified as financial data, etc.

Operations of the Contract Forest system may include 808 evaluating the received data using the one or more selected transforms to generate an evaluated result. For example, as shown in FIG. 2, an evaluation process 216 transforms the received data (e.g., Data File-A (212)) using the selected transform (e.g., Transformation Function-A (214)). Operations of the Contract Forest system may include 810 providing the evaluated result to the distributed network. For example, as shown in FIG. 2, an evaluation process 216 stores the generated (e.g., transformed) results within the distributed network 204 and also transmits the generated results to the initiator 200 (generally indicated by 218).

Operations of the Contract Forest system may include receiving a data transformation request comprising an address of the received data. For example, as shown in FIG. 2 above, the initiator 200 submits a data transformation request 202 to be serviced by a distributed network 204. The data transformation request 202 can include an address of the data to be received within the distributed network 204.

In this example, the address can be any of the example contract forest addresses described herein (e.g., the IPCF address 210). In some examples, the IPCF address corresponds to functions or commands that perform operations on input data and to nodes within the DAG which identify data to be loaded and/or receive one or more operations.

In some implementations, the received data and the evaluated result are cryptographically secured and the one or more selected transforms are digitally signed and authenticated and receiving the data is based on whether the data has been previously validated (e.g., as described with reference to FIG. 4). In some implementations, evaluating the received data using the one or more selected transforms comprises encoding an address of the received data into the evaluated result and encoding an address of the one or more selected transforms into the evaluated result. For example, as explained above with reference to block 216 of FIG. 2, the Node-A 208 can encode the address of the Data File-A (212) and the address of the Transformation Function-A (214) into the generated result 218.

In some implementations, selecting the one or more transforms comprises comparing a signature representing a jurisdiction of a particular transform with a jurisdiction of the node, wherein selecting the one or more transforms is further based on the comparison. For example, as explained above with reference to block 206 of FIG. 2, the Node-A 208 can select the transforms based on whether the jurisdiction of the Node-A 208 and/or the initiator 200 matches the jurisdiction represented by the signature of the particular transforms. In some examples, the signature is defined by a rulemaking agency (such as the rulemaking agency 400 shown in FIGS. 4-7). In some implementations, a specification of the transform is created by the rulemaking agency. For example, as described above with reference to FIG. 5, the rulemaking agency 400 can define the transformation specification 402.

In some implementations, analyzing the received data in a semantic manner comprises determining one or more sequences (e.g., one or more contiguous character patterns) of data fields (e.g., energy fields such as "kW", "kWh", etc., medical fields such as "weight", "height", etc., financial fields such as "currency", "money", etc.) embedded in the received data using a machine learning system trained on historical data stored at the node. For example, as explained above with reference to block 210 of FIG. 2, the machine learning system can be trained to identify the received data based on historical data with a known data type (e.g., known energy data is used to train the machine learning system by identifying most likely data fields associated with a particular data type.

Figure 9:
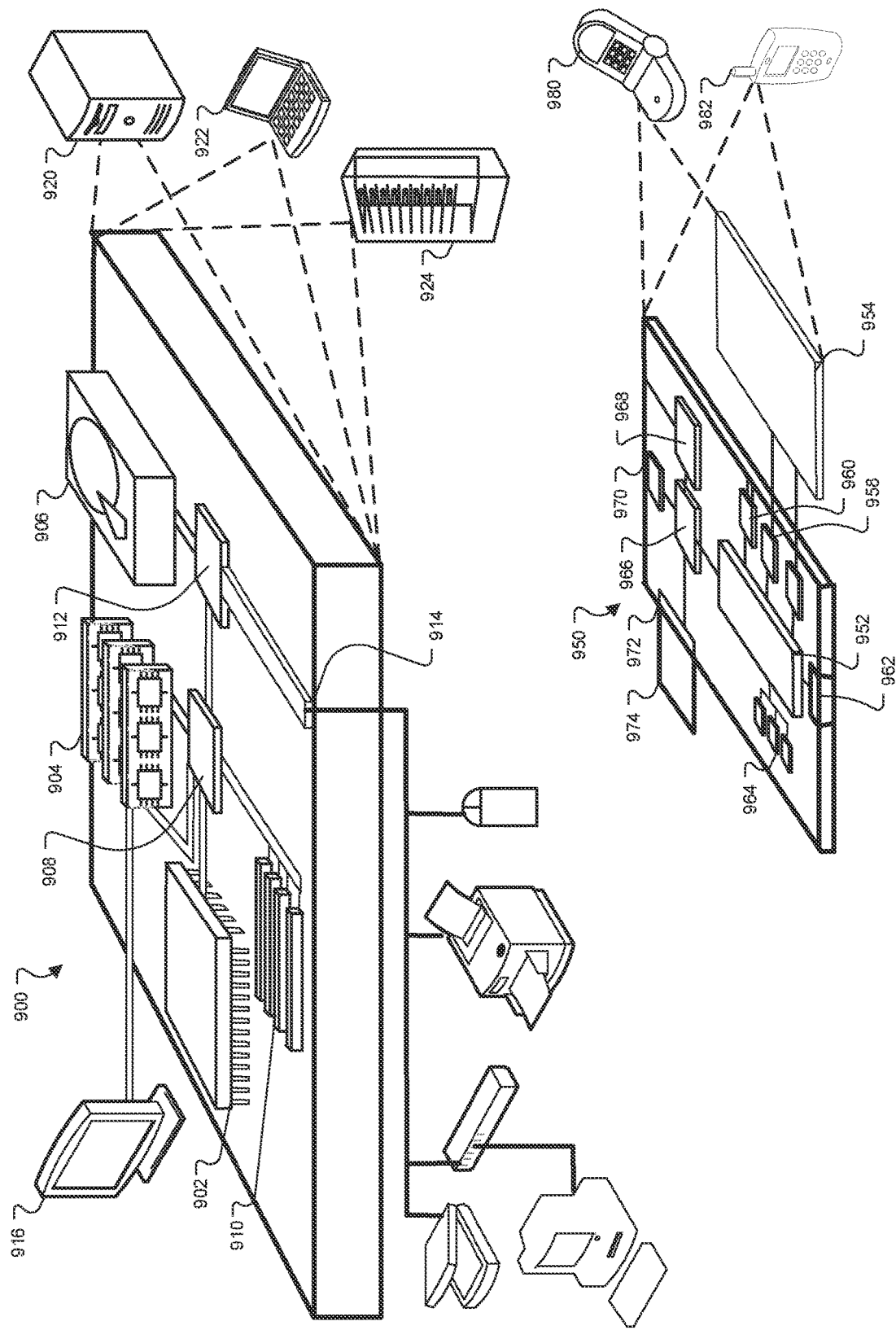
FIG. 9 illustrates an example of a computing device and a mobile computing device that can be used to implement the techniques described here.

FIG. 9 shows an example of example computer device 900 and example mobile computer device 950, which can be used to implement the techniques described herein. For example, a portion or all of the transformation, validation, etc. operations may be executed by the computer device 900 and/or the mobile computer device 950. Computing device 900 is intended to represent various forms of digital computers, including, e.g., laptops, desktops, workstations, personal digital assistants, servers, blade servers, mainframes, and other appropriate computers. Computing device 950 is intended to represent various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed in this document.

Computing device 900 includes processor 902, memory 904, storage device 906, high-speed interface 908 connecting to memory 904 and high-speed expansion ports 910, and low speed interface 912 connecting to low speed bus 914 and storage device 906. Each of components 902, 904, 906, 908, 910, and 912, are interconnected using various busses, and can be mounted on a common motherboard or in other manners as appropriate. Processor 902 can process instructions for execution within computing device 900, including instructions stored in memory 904 or on storage device 906 to display graphical data for a GUI on an external input/output device, including, e.g., display 916 coupled to high speed interface 908. In other implementations, multiple processors and/or multiple busses can be used, as appropriate, along with multiple memories and types of memory. Also, multiple computing devices 900 can be connected, with each device providing portions of the necessary operations (e.g., as a server bank, a group of blade servers, or a multi-processor system).

Memory 904 stores data within computing device 900. In one implementation, memory 904 is a volatile memory unit or units. In another implementation, memory 904 is a non-volatile memory unit or units. Memory 904 also can be another form of computer-readable medium (e.g., a magnetic or optical disk. Memory 904 may be non-transitory.)

Storage device 906 is capable of providing mass storage for computing device 900. In one implementation, storage device 906 can be or contain a computer-readable medium (e.g., a floppy disk device, a hard disk device, an optical disk device, or a tape device, a flash memory or other similar solid state memory device, or an array of devices, such as devices in a storage area network or other configurations.) A computer program product can be tangibly embodied in a data carrier. The computer program product also can contain instructions that, when executed, perform one or more methods (e.g., those described above.) The data carrier is a computer- or machine-readable medium, (e.g., memory 904, storage device 906, memory on processor 902, and the like.)

High-speed controller 908 manages bandwidth-intensive operations for computing device 900, while low speed controller 912 manages lower bandwidth-intensive operations. Such allocation of functions is an example only. In one implementation, high-speed controller 908 is coupled to memory 904, display 916 (e.g., through a graphics processor or accelerator), and to high-speed expansion ports 910, which can accept various expansion cards (not shown). In the implementation, low-speed controller 912 is coupled to storage device 906 and low-speed expansion port 914. The low-speed expansion port, which can include various communication ports (e.g., USB, Bluetooth®, Ethernet, wireless Ethernet), can be coupled to one or more input/output devices, (e.g., a keyboard, a pointing device, a scanner, or a networking device including a switch or router, e.g., through a network adapter.)

Computing device 900 can be implemented in a number of different forms, as shown in the figure. For example, it can be implemented as standard server 920, or multiple times in a group of such servers. It also can be implemented as part of rack server system 924. In addition or as an alternative, it can be implemented in a personal computer (e.g., laptop computer 922.) In some examples, components from computing device 900 can be combined with other components in a mobile device (not shown), e.g., device 950. Each of such devices can contain one or more of computing device 900, 950, and an entire system can be made up of multiple computing devices 900, 950 communicating with each other.

Computing device 950 includes processor 952, memory 964, an input/output device (e.g., display 954, communication interface 966, and transceiver 968) among other components. Device 950 also can be provided with a storage device, (e.g., a microdrive or other device) to provide additional storage. Each of components 950, 952, 964, 954, 966, and 968, are interconnected using various buses, and several of the components can be mounted on a common motherboard or in other manners as appropriate.

Processor 952 can execute instructions within computing device 950, including instructions stored in memory 964. The processor can be implemented as a chipset of chips that include separate and multiple analog and digital processors. The processor can provide, for example, for coordination of the other components of device 950, e.g., control of user interfaces, applications run by device 950, and wireless communication by device 950.

Processor 952 can communicate with a user through control interface 958 and display interface 956 coupled to display 954. Display 954 can be, for example, a TFT LCD (Thin-Film-Transistor Liquid Crystal Display) or an OLED (Organic Light Emitting Diode) display, or other appropriate display technology. Display interface 956 can comprise appropriate circuitry for driving display 954 to present graphical and other data to a user. Control interface 958 can receive commands from a user and convert them for submission to processor 952. In addition, external interface 962 can communicate with processor 942, so as to enable near area communication of device 950 with other devices. External interface 962 can provide, for example, for wired communication in some implementations, or for wireless communication in other implementations, and multiple interfaces also can be used.

Memory 964 stores data within computing device 950. Memory 964 can be implemented as one or more of a computer-readable medium or media, a volatile memory unit or units, or a non-volatile memory unit or units. Expansion memory 974 also can be provided and connected to device 950 through expansion interface 972, which can include, for example, a SIMM (Single In Line Memory Module) card interface. Such expansion memory 974 can provide extra storage space for device 950, or also can store applications or other data for device 950. Specifically, expansion memory 974 can include instructions to carry out or supplement the processes described above, and can include secure data also. Thus, for example, expansion memory 974 can be provided as a security module for device 950, and can be programmed with instructions that permit secure use of device 950. In addition, secure applications can be provided through the SIMM cards, along with additional data, (e.g., placing identifying data on the SIMM card in a non-hackable manner.)

The memory can include, for example, flash memory and/or NVRAM memory, as discussed below. In one implementation, a computer program product is tangibly embodied in a data carrier. The computer program product contains instructions that, when executed, perform one or more methods, e.g., those described above. The data carrier is a computer- or machine-readable medium (e.g., memory 964, expansion memory 974, and/or memory on processor 952), which can be received, for example, over transceiver 968 or external interface 962.

Device 950 can communicate wirelessly through communication interface 966, which can include digital signal processing circuitry where necessary. Communication interface 966 can provide for communications under various modes or protocols (e.g., GSM voice calls, SMS, EMS, or MMS messaging, CDMA, TDMA, PDC, WCDMA, CDMA2000, or GPRS, among others.) Such communication can occur, for example, through radio-frequency transceiver 968. In addition, short-range communication can occur, e.g., using a Bluetooth®, WiFi, or other such transceiver (not shown). In addition, GPS (Global Positioning System) receiver module 970 can provide additional navigation- and location-related wireless data to device 950, which can be used as appropriate by applications running on device 950. Sensors and modules such as cameras, microphones, compasses, accelerators (for orientation sensing), etc. may be included in the device.

Device 950 also can communicate audibly using audio codec 960, which can receive spoken data from a user and convert it to usable digital data. Audio codec 960 can likewise generate audible sound for a user, (e.g., through a speaker in a handset of device 950.) Such sound can include sound from voice telephone calls, can include recorded sound (e.g., voice messages, music files, and the like) and also can include sound generated by applications operating on device 950.

Computing device 950 can be implemented in a number of different forms, as shown in the figure. For example, it can be implemented as cellular telephone 980. It also can be implemented as part of smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor. The programmable processor can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a device for displaying data to the user (e.g., a CRT (cathode ray tube) or LCD (liquid crystal display) monitor), and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such back end, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

A number of systems and methods have been described. Nevertheless, it will be understood that various modifications may be made without departing from the spirit and scope of this disclosure. For example, although the evaporators have been generally illustrated as being in vertical orientation during use, some machines have evaporators that are oriented horizontally or an angle to gravity during use. Accordingly, other embodiments are within the scope of the following claims.

What is claimed is:

1. A computing device implemented method comprising:
receiving cryptographically secured data representing a request for information stored at a node of a distributed network based on whether the cryptographically secured data has been previously validated, the stored information containing sensitive information;
semantically searching, using a machine learning system trained on historical data, the received cryptographically secured data to identify one or more data types reflected in the received cryptographically secured data;
selecting one or more digitally signed and authenticated transforms based on the one or more data types of the received cryptographically secured data and data types used by the one or more digitally signed and authenticated transforms;
evaluating the received cryptographically secured data using the one or more selected digitally signed and authenticated transforms to generate an evaluated cryptographically secured result that does not contain sensitive information; and
providing the evaluated cryptographically secured result to the distributed network in response to the request for information.

2. The computing device implemented method of claim 1, wherein the received cryptographically secured data comprises a data transformation request comprising an address of the received cryptographically secured data.

3. The computing device implemented method of claim 1, wherein evaluating the received cryptographically secured data using the one or more selected digitally signed and authenticated transforms comprises encoding an address of the received cryptographically secured data into the evaluated cryptographically secured result and encoding an address of the one or more selected digitally signed and authenticated transforms into the evaluated cryptographically secured result.

4. The computing device implemented method of claim 1, wherein selecting the one or more digitally signed and authenticated transforms comprises comparing a signature representing a jurisdiction of a particular transform with a jurisdiction of the node, wherein selecting the one or more digitally signed and authenticated transforms is further based on the comparison.

5. The computing device implemented method of claim 1, wherein semantically searching the received cryptographically secured data comprises determining one or more sequences of data fields embedded in the received cryptographically secured data using the machine learning system trained using the historical data.

6. The computing device implemented method of claim 1, wherein the sensitive information comprises personally identifiable information.

7. A system comprising:
a computing device comprising:
a memory configured to store instructions; and
a processor to execute the instructions to perform operations comprising:
receiving cryptographically secured data representing a request for information stored at a node of a distributed network based on whether the cryptographically secured data has been previously validated, the stored information containing sensitive information;
semantically searching, using a machine learning system trained on historical data, the received cryptographically secured data to identify one or more data types reflected in the received cryptographically secured data;
selecting one or more digitally signed and authenticated transforms based on the one or more data types of the received cryptographically secured data and data types used by the one or more digitally signed and authenticated transforms;
evaluating the received cryptographically secured data using the one or more selected digitally signed and authenticated transforms to generate an evaluated cryptographically secured result that does not contain sensitive information; and
providing the evaluated cryptographically secured result to the distributed network in response to the request for information.

8. The system of claim 7, wherein the received cryptographically secured data comprises a data transformation request comprising an address of the received cryptographically secured data.

9. The system of claim 7, wherein evaluating the received cryptographically secured data using the one or more selected digitally signed and authenticated transforms comprises encoding an address of the received cryptographically secured data into the evaluated cryptographically secured result and encoding an address of the one or more selected digitally signed and authenticated transforms into the evaluated cryptographically secured result.

10. The system of claim 7, wherein selecting the one or more digitally signed and authenticated transforms comprises comparing a signature representing a jurisdiction of a particular transform with a jurisdiction of the node, wherein selecting the one or more digitally signed and authenticated transforms is further based on the comparison.

11. The system of claim 7, wherein semantically searching the received cryptographically secured data comprises determining one or more sequences of data fields embedded in the received cryptographically secured data using the machine learning system trained using the historical data.

12. The system of claim 7, wherein the sensitive information comprises personally identifiable information.

13. One or more non-transitory computer readable media storing instructions that are executable by a processing device, and upon such execution cause the processing device to perform operations comprising:
- receiving cryptographically secured data representing a request for information stored at a node of a distributed network based on whether the cryptographically secured data has been previously validated, the stored information containing sensitive information;
- semantically searching, using a machine learning system trained on historical data, the received cryptographically secured data to identify one or more data types reflected in the received cryptographically secured data;
- selecting one or more digitally signed and authenticated transforms based on the one or more data types of the received cryptographically secured data and data types used by the one or more digitally signed and authenticated transforms;
- evaluating the received cryptographically secured data using the one or more selected digitally signed and authenticated selected transforms to generate an evaluated cryptographically secured result that does not contain sensitive information; and
- providing the evaluated cryptographically secured result to the distributed network in response to the request for information.

14. The one or more non-transitory computer readable media of claim 13, wherein the received cryptographically secured data comprises a data transformation request comprising an address of the received data.

15. The one or more non-transitory computer readable media of claim 13, wherein evaluating the received cryptographically secured data using the one or more selected digitally signed and authenticated transforms comprises encoding an address of the received cryptographically secured data into the evaluated cryptographically secured result and encoding an address of the one or more selected digitally signed and authenticated transforms into the evaluated cryptographically secured result.

16. The system one or more non-transitory computer readable media of claim 13, wherein selecting the one or more digitally signed and authenticated transforms comprises comparing a signature representing a jurisdiction of a particular transform with a jurisdiction of the node, wherein selecting the one or more digitally signed and authenticated transforms is further based on the comparison.

17. The one or more non-transitory computer readable media of claim 13, wherein semantically searching the received cryptographically secured data comprises determining one or more sequences of data fields embedded in the received cryptographically secured data using the machine learning system trained using the historical data.

* * * * *